United States Patent [19]

Umehara et al.

[11] Patent Number: 5,002,812
[45] Date of Patent: Mar. 26, 1991

[54] OPTICAL INFORMATION RECORDING MEDIUM, INFORMATION RECORDING METHOD AND OPTICAL INFORMATION RECORDING SYSTEM USING THE MEDIUM

[75] Inventors: Masaakira Umehara; Tsutomu Satoh; Hideaki Ohba; Keiko Ichinose, all of Yokohama, Japan

[73] Assignee: Ricoh Company, Ltd., Tokyo, Japan

[21] Appl. No.: 366,141

[22] Filed: Jun. 14, 1989

[30] Foreign Application Priority Data

| Jun. 15, 1988 | [JP] | Japan | 63-147511 |
| Nov. 2, 1988 | [JP] | Japan | 63-276086 |
| Nov. 2, 1988 | [JP] | Japan | 63-276087 |
| Nov. 16, 1988 | [JP] | Japan | 63-289813 |
| Dec. 5, 1988 | [JP] | Japan | 63-308520 |

[51] Int. Cl.$^5$ .............................................. B32B 3/00
[52] U.S. Cl. .......................................... 428/64; 428/65; 428/913; 430/270; 430/995; 369/288; 346/76 L; 346/135.1
[58] Field of Search ........................... 428/64, 65, 913; 430/270, 945; 369/288; 346/76 L, 135.1

[56] References Cited

U.S. PATENT DOCUMENTS

| 4,460,665 | 7/1984 | Kunikane et al. | 428/199 |
| 4,504,548 | 3/1986 | Esho et al. | 430/945 |
| 4,719,613 | 1/1988 | Hirose et al. | 430/945 |
| 4,766,054 | 8/1988 | Hirose et al. | 430/945 |
| 4,798,781 | 1/1989 | Hirose et al. | 430/945 |
| 4,859,569 | 8/1989 | Hirose et al. | 430/945 |
| 4,863,832 | 9/1989 | Saitoh et al. | 430/945 |

Primary Examiner—Patrick J. Ryan
Attorney, Agent, or Firm—Cooper & Dunham

[57] ABSTRACT

An optical information recording medium comprising a substrate; a recording layer comprising as the main component an organic dye component, formed on the substrate, which recording layer has a maximum peak in the spectroscopic reflectance thereof near the wavelength of the information recording and reproduction light, and has a thickness at which the spectroscopic reflectance thereof is maximized at the wavelength of the information recording and reproduction light, and an optical information recording method, and a system for recording and/or reproducing information using this recording medium are disclosed.

17 Claims, 5 Drawing Sheets

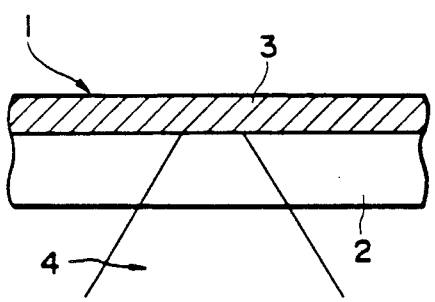
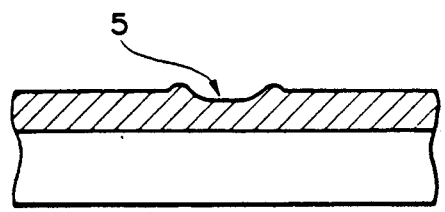

FIG.6a1
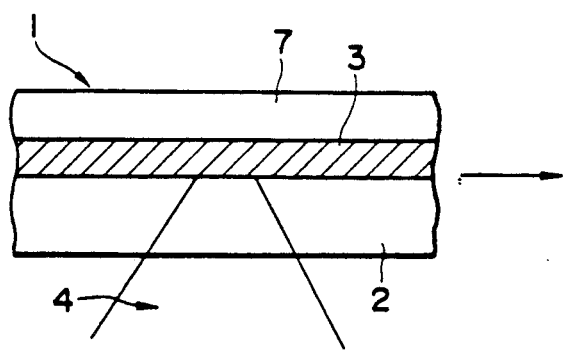
FIG.6b1
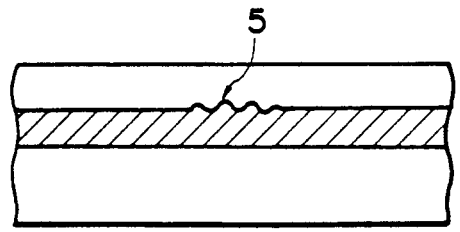
FIG.6a2
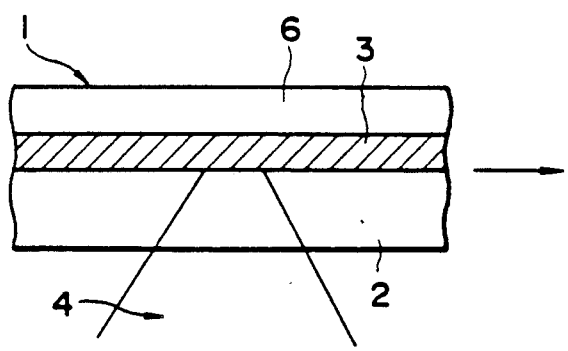
FIG.6b2
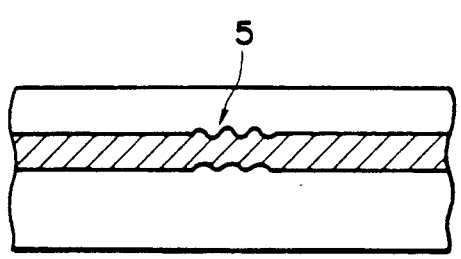
FIG.6a3
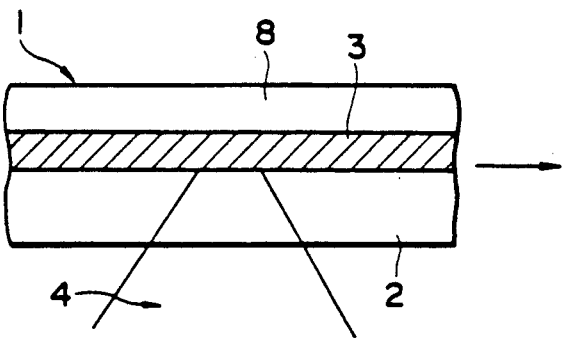
FIG.6b3
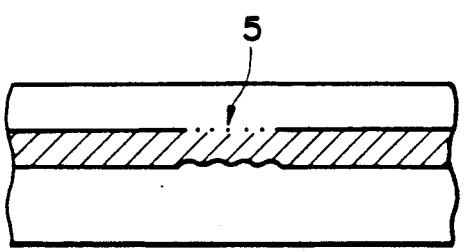

OPTICAL INFORMATION RECORDING MEDIUM, INFORMATION RECORDING METHOD AND OPTICAL INFORMATION RECORDING SYSTEM USING THE MEDIUM

BACKGROUND OF THE INVENTION

1. Field of the Invention

This invention relates to an improved optical information recording medium utilizable in the field of optical recording, and to an optical information recording method and a system for recording and/or reproducing information using the same.

2. Discussion of Background

An optical information recording medium such as an optical disk has an extremely large capacity, and information can be recorded in or reproduced from the recording medium without making physical contact with it. Furthermore, information recorded in the optical information recording medium is readily accessible. Owing to such advantages, the optical information recording medium has been widely utilized, for instance, for apparatus for filing documents, motion pictures and motionless pictures, and external storage and back-up memory devices for computers.

Conventional optical information recording media are typically classified into the following three types:

(a) an optical information recording medium comprising a recording layer of a thin film whose main component is a metal having a low melting point such as Te;

(b) an optical information recording medium comprising a recording layer consisting of a light-reflection layer and an organic light-absorption layer; and (c) an optical information recording medium comprising a recording layer made of an organic pigment having high reflectance.

Since the melting point of the metal used in the recording layer of the above recording medium (a) is low, high preservability cannot be expected.

The recording layers of the recording medium (a) are further divided into two types, that is, a pitting type, and a phase-transition type. When information is recorded in a pitting-type recording layer, pits are formed on the surface of the recording layer by applying light thereto. In case of the phase-transition type, a change in the reflectance, which is caused by phase transition between crystal and amorphous of the metal, is applied to information recording.

The pitting-type recording layer has low resolving power, so that high recording density cannot be expected. Regarding the phase-transition-type recording layer, control of the conditions for production is quite complicated, and the price of the final product thus becomes extremely high.

A recording layer of the optical information recording medium (b) is prepared by coating an organic light-absorption layer on a metallic light-reflection layer. Information is recorded in the organic light-absorption layer, which is performed by forming pits on the layer by applying laser beams thereto.

The recording layer of this type consists of two layers, so that it cannot be easily prepared. In addition, recording or reproduction of information on the substrate side is not easy due to the presence of the light-reflection layer.

A recording layer of the optical information recording medium (c) is prepared by forming a organic-pigment thin layer having high reflectance on a substrate. The organic pigment has a high melting point or decomposition temperature and low thermal conductivity, so that a recording layer having high sensitivity, C/N ratio and reliability is obtainable. Furthermore, since the organic pigment layer can be readily formed on a substrate by means of coating, it can be efficiently mass-produced, and the price of the final product can thus be made lower.

However, the recording medium of this type cannot maintain high sensitivity and C/N ratio unless it is fabricated with an air-sandwich structure. It is therefore difficult to make the recording medium thin, and application of the recording medium to an optical flexible disk is thus quite hard. The recording media of (a) and (b) also suffer from the same problem.

With respect to an optical disk, a disk having a diameter of 30 cm was initially commercialized, and then the size has been made smaller to 20 cm, and even to 13 cm in diameter. Aiming at development of the market for personal-use, a target size of the optical disk is now 9 cm.

It is, however, extremely difficult to obtain a small and thin optical disk as far as it is fabricated with a conventional air-sandwich structure. In the case where a substrate having a thickness of 1.2 mm is employed, the thickness of the final disk becomes at least 3 mm, and it is not easy at all to prepare a disk thinner than 3 mm.

A conventional optical disk comprising a recording medium of the pitting type basically consists of a substrate, a recording layer and air. The air layer serves as a heat insulating layer, so that high thermal efficiency is ensured. Furthermore, since the air layer does not restrain vaporization, decomposition and scattering of the recording layer, which commonly take place when information is recorded, high sensitivity and C/N ratio are also ensured. Therefore, if a protective layer is formed instead of the air layer, the sensitivity and C/N ratio of the optical disk are highly deteriorated.

SUMMARY THE INVENTION

Accordingly, it is an object of the present invention to provide a thin optical information recording medium having high sensitivity, C/N ratio and reliability.

Another object of the present invention is to provide an information recording method, which uses the above optical information recording medium.

A further object of the present invention is to provide a system for recording and/or reproducing information, which uses the above optical information recording medium.

The first object of the present invention can be attained by an optical information recording medium comprising: a substrate; a recording layer comprising as the main component an organic dye component, formed on the substrate, which recording layer has its maximum spectral reflectance peak near the wavelength of information recording and reproduction light, and has a thickness at which the spectral reflectance thereof is maximized at the wavelength of the information recording and reproduction light. The terms "dye" and "pigment" are used interchangeably herein to refer to both dyes and pigments.

The second object of the present invention can be attained by an optical information recording method comprising the steps of: applying a light beam having a wavelength at which the spectral reflectance of a recording layer of the above-mentioned optical information recording medium is maximized, and modifying or locally disrupting the interference structure of said recording layer so as to correspond to the information to be recorded by the light applied thereto.

The third object of the present invention can be attained by a system for recording and/or reproducing information, including (a) an optical information recording medium comprising a substrate and a recording layer formed thereon, (b) means for applying a beam of recording or reproducing light of a particular wavelength to the recording medium to record information therein or to reproduce information previously recorded therein, the recording layer comprising, as its main component, an organic dye component, and having a maximum spectral reflectance peak at a wavelength near the particular wavelength, and having a thickness such that its spectral reflectance is maximized at the particular wavelength.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 5, 6 and 7 are schematic illustrations each showing the process of information recording in the optical information recording medium according to the present invention.

DETAILED DESCRIPTION AND THE PREFERRED EMBODIMENTS

The present invention will now be explained in more detail with reference to the accompanying drawings.

Figure 2:
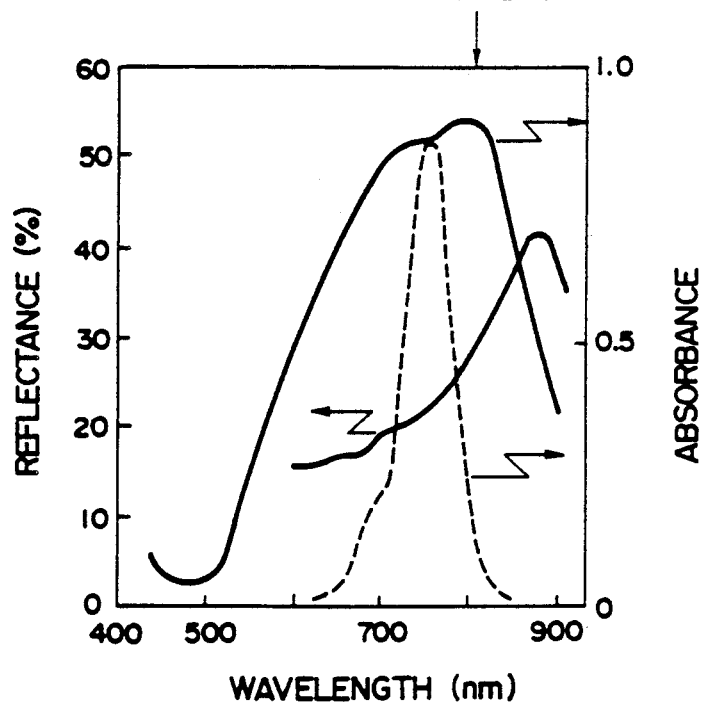
FIG. 2 is a chart showing the reflection curve and the absorption curve of an organic pigment layer for use in a conventional optical information recording medium.

In most of the conventional optical information recording media which comprise a recording layer consisting of an organic pigment mono-layer, the organic pigment has the peaks of absorbance and reflectance at wavelengths in the vicinity of 800 nm and 870 nm, respectively, as shown in FIG. 2.

Namely, an organic pigment which has the peak of absorbance in the vicinity of a recording and reproduction wavelength has been used in a recording layer of a conventional recording medium.

This is based on the idea that a highly sensitive recording medium can be obtained by enhancing the absorption efficiency of optical energy applied to the pigment layer and accelerating both decomposition and sublimation of the pigment.

In contrast with the above, light having a wavelength in the vicinity of the wavelength at which the peak of the reflection curve of the pigment layer occurs is used for recording and reproduction of information in the present invention.

Figure 1:
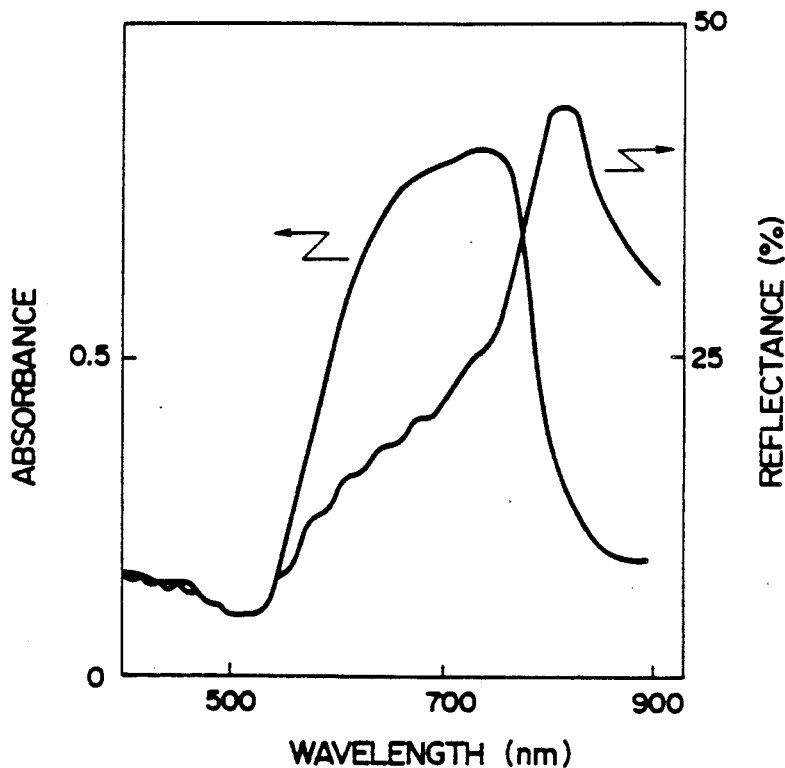
FIG. 1 is a chart showing the reflection curve and the absorption curve of an organic pigment layer for use in the optical information recording medium according to the present invention.
Figure 3:
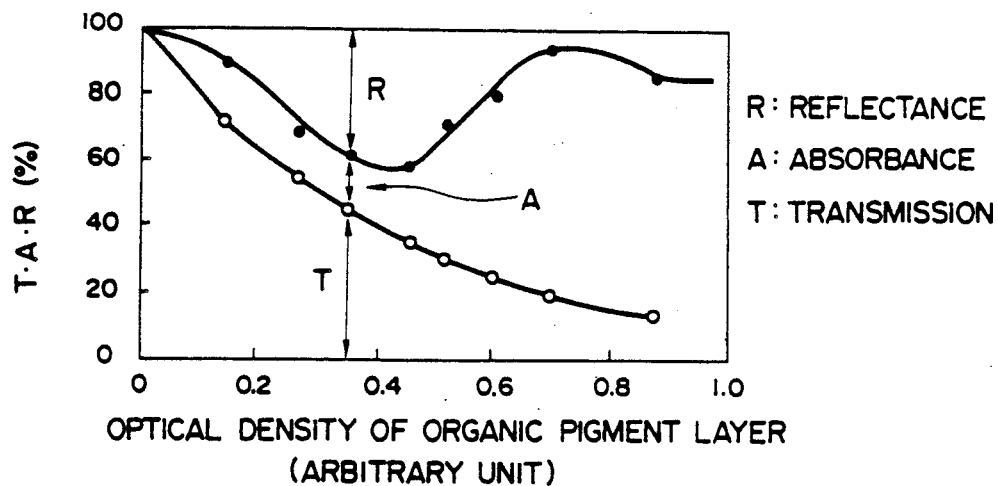
FIG. 3 is a graph showing the relationship among the reflectance, transmittance, absorbance and the optical density of the organic pigment layer for use in the optical information recording medium according to the present invention.

Therefore, a pigment whose reflection curve has its peak in the vicinity of a recording and reproducing wavelength as shown in FIG. 1 is used in the recording layer of the recording medium of the present invention. The thickness of the recording layer is determined so that the dependency of the reflectance on the thickness of the recording layer is maximized at the recording and reproduction wavelength. In other words, the thickness of the recording layer is fixed so as to maximize its reflectance as caused by the interference between the lights reflected by the obverse and the reverse of the recording layer. The recording medium comprising such a recording layer has high reflectance and low absorbance as shown in FIGS. 1 and 3. FIG. 3 is a graph showing the dependency of both the reflectance and the transmittance on the thickness of the pigment layer used in an Example which will be described later.

Figure 4:
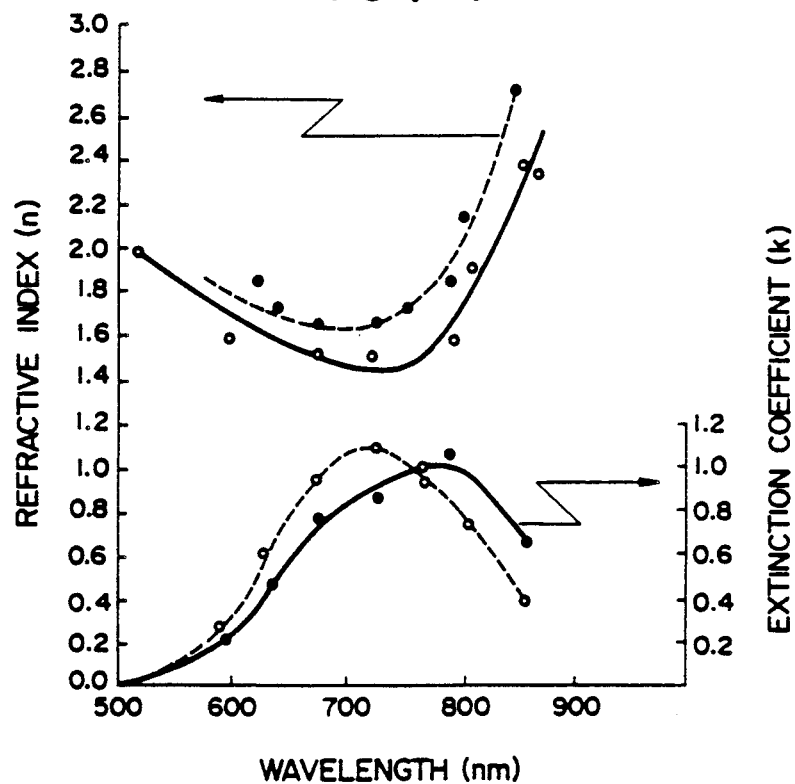
FIG. 4 is a graph showing the relationship between the refractive index and the wavelength, and the relationship between the extinction coefficient and the wavelength of an organic pigment layer for use in a conventional optical information recording medium.

As shown in the graph in FIG. 4, when the complex index of refraction of a pigment is expressed by $\hat{n} = n - ik$, the extinction coefficient k of an ordinary organic pigment is maximized and n is minimized in the vicinity of the wavelength at which the peak of absorbance is indicated, and the value n is drastically increased in the region of longer wavelength compared with the wavelength at which the absorption peak is indicated.

For instance, in case of the interface between the recording layer and a plastic layer (a protective layer) whose complex index of refraction is expressed by $\hat{n} = 1.5 - i0.0$, the reflectance R is given by the following equation:

$$R = \{(n-1.5)^2 + k^2\}/\{(n+1.5)^2 + k^2\}$$

As understood from the above equation, n is the most influential factor in the above-described longer-wavelength region.

When a recording medium comprises, as a recording layer, an organic pigment layer having the aforementioned optical properties and thickness, the recording medium absorbs only a small quantity of light, and sudden decomposition and sublimation of the pigment layer thus scarcely take place. However, even slight distortion of the pigment layer drastically lowers the reflectance, so that recording can be effectively performed.

The process of information recording in the recording medium of the present invention is schematically illustrated in FIG. 5. In this figure, reference numeral 1 designates a recording medium, reference numeral 2 designates a substrate, reference numeral 3 designates a recording layer, reference numeral 4 designates a beam of light applied to the recording medium, and reference numeral 5 designates a pit formed by the applied light. The angle of incidence of the light indicated by reference numeral 4 is substantially normal to the recording layer 3. In FIG. 5, the incident light at the recording layer is depicted so as to be oblique, but the figure shows the focused meeting point of the beam of the light on the recording layer 3.

The processes of recording information in the recording media of three other embodiments according to the present invention are schematically illustrated in FIG. 6. In FIG. 6, the angle of incidence of the light indicated by reference numeral 4 is also substantially normal to the recording layer 3 as explained with reference to FIG. 5.

In FIGS. 6 ($a_1$) and ($b_1$), reference numerals 1 to 5 designate the identical parts to those in FIG. 5, and reference numeral 7 designates a protective layer comprising thermoplastic resin. When laser beams are applied to this recording medium 1, materials of the protective layer 7 and the recording layer (pigment layer) 3 are mingled with each other at the interface therebetween, and the interface thus becomes indistinct. The beams reflected on such an interface do not interfere any more, and this causes partial deterioration of the reflectance. Thus, information is successfully recorded in the recording medium. High sensitivity and C/N ratio can be achieved by suitably selecting a material and the thickness of the recording layer (pigment layer), and controlling thermal and chemical properties of the protective layer.

In FIGS. 6 ($a_2$) and ($b_2$), reference numerals 1 to 5 designate the identical parts to those in FIG. 5, and reference numeral 6 designates a light-absorption layer which strongly absorbs light applied to the recording medium 1. When laser beams are applied to this recording medium 1, stronger thermal energy is emerged, and the light-absorption layer 6 and the light-reflection layer (recording layer) 3 are mingled with each other at the interface therebetween. The interface thus becomes indistinct, and beams reflected on such an interface do not interfere any more, causing partial deterioration of the reflectance. Thus, information is effectively recorded in the recording medium.

In FIGS. 6 ($a_3$) and ($b_3$), reference numerals 1 to 5 designate the identical parts to those in FIG. 5, and reference numeral 8 designates a thermo-melting layer which has a melting point lower than that of the light-reflection-absorption layer (recording layer) 3. When laser beams are applied to this recording medium 1, the thermo-melting layer 8 is fused by thermal energy emerged in the light-absorption-reflection layer 3, and materials of these two layers are mingled with each other at the interface therebetween. The interface thus becomes indistinct, and beams reflected on such an interface do not interfere any more, causing partial deterioration of the reflectance. Thus, information is effectively recorded in the recording medium.

Reproduction of information recorded in the above recording medium can be performed by applying weaker light; approximately 1/10 power of light employed for recording is quite enough. Therefore, the recording layer, light-reflection layer or light-reflection-absorption layer absorbs only a small quantity of light, and undergoes less deterioration.

Further, because of the presence of the protective layer, light-absorption layer or thermo-melting layer, the pigment contained in the layer is never exposed to oxygen contained in air. The recording layer, light-reflection layer or light-reflection-absorption layer thus undergoes less deterioration by light applied to the recording medium for reproduction of information.

Figure 7:
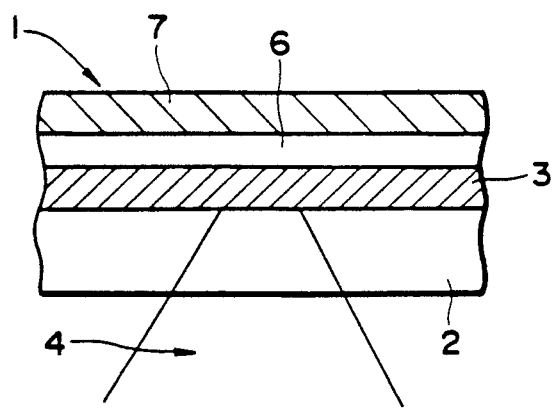

By forming the protective layer 7 on the light-absorption layer 6 or the thermo-melting layer 8 as shown in FIG. 7, an information recording medium having a mono-plate structure can be attained. Such an information recording medium is very thin compared with a conventional air-sandwiched-type recording medium, so that it is utilizable to an optical card, an optical flexible disk and the like. In FIG. 7, the angle of incidence of the light indicated by reference numeral 4 is also substantially normal to the recording layer 3 as explained with reference to FIG. 5.

A system for recording and/or reproducing information, according to the present invention comprises (a) an optical information recording medium comprising a substrate and a recording layer formed thereon, (b) means for applying a beam of recording or reproducing light of a particular wavelength to the recording medium to record information therein or to reproduce information previously recorded therein, the recording layer comprising, as its main component, an organic dye component, and having a maximum spectral reflectance peak at a wavelength near the particular wavelength, and having a thickness such that its spectral reflectance is maximized at the particular wavelength.

In the above system, basically any wavelength can be selected as the above particular recording/reproducing wavelength, for instance, a beam of recording or reproducing light having any semiconductor laser wavelength region so long as a layer thickness is selected so as to maximize the reflectance at the particular recording/reproducing wavelength. However, for practical use at present time, it is convenient for using a recording or reproducing light having a wavelength in a range between about 770 and about 840.

Specific materials for each of the above layers of the optical information recording medium according to the present information and the necessary properties for each layer will now be explained.

(1) Substrate

Only when recording and reproduction of information are performed by application of laser beams to the substrate side, the substrate is required to be transparent to the laser beams.

Examples of a material for the substrate include plastics such as polyester, acrylic resin, polyamide resin, polycarbonate resin, polyolefine resin, phenol resin, epoxy resin and polyimide resin, glass, ceramics and metals.

On the surface of the substrate, preformats for address signals, and pregrooves serving as guide grooves may be formed, if necessary.

(2) Undercoat Layer

An undercoat layer may be formed between the substrate and the recording layer for the following purposes: (a) improvement of the adhesion between the substrate and the recording layer, (b) protection of the recording layer from water and gases, (c) improvement of the preservation stability of the recording layer, (d) improvement of the reflectance of the recording layer, (e) protection of the substrate from solvents, and (f) formation of preformats, pregrooves or guide grooves.

For the above purpose (a), a variety of polymeric materials such as ionomer resins, polyamide resins, vinyl resins, natural resins, natural polymeric materials, silicone and liquid rubber; and silane coupling agents can be employed.

For the purposes (b) and (c), inorganic compounds such as $SiO_2$, $MgF_2$, $SiO$, $TiO_2$, $ZnO$, $TiN$ and $SiN$; and metals or metalloids such as Zn, Cu, S, Ni, Cr, Ge, Se, Au, Ag and Al can be used in addition to the above-described polymeric materials.

The purpose (d) can be achieved by using metals such as Al, Ag and Te; and organic thin layers having metallic gloss such as methine dyes and xanthene dyes.

For the purposes (e) and (f), it is preferable to employ ultraviolet ray-setting resins, thermosetting resins or thermoplastic resins.

(3) Recording Layer (Light-Reflection Layer, Light-Reflection-Absorption Layer)

Information is recorded in the recording layer by applying laser beams to the recording medium to cause some optical changes in the recording layer. Examples of the main component of the recording layer include croconium dyes, azulene dyes and pigments, triphenothiazine compounds, phenanthrene derivatives, phthalocyanine compounds, tetrahydrocorrin compounds, dioxane compounds and derivatives thereof, anthraquinone derivatives, xanthene dyes, triphenylmethane dyes, squalyrium dyes, polymethine dyes such as pyrylium dyes, cyanine dyes and merocyanine dyes, croconium dyes combined with polymethine, azulene dyes combined with polymethine.

In order to improve the recording characteristics and stability of the recording layer, the following auxiliary components can be used in combination with the above main component, or by laminating on the above-described recording layer. Examples of such auxiliary components include phthalocyanine dyes, tetrahydrocorrin dyes, dioxazine dyes, triphenothiazine dyes, phenanthrene dyes, anthraquinone (indanthrene) dyes, cyanine (merocyanine) dyes, croconium dyes, xanthene dyes, triphenylmethane dyes, pyrylium dyes, squalyrium dyes, azulene dyes, and metals and metallic compounds such as In, Sn, Te, Bi, Al, Se, $TeO_2$, SnO, As and Cd.

Furthermore, polymeric materials; low molecular organic compounds, for instance, aminium compounds, imonium compounds and diimonium compounds; and low molecular organic complex compounds, for instance, bisdithiodiketone complexes and bisphenyldithiol complexes, which are capable of absorbing light having a longer wavelength than that of the light that can be absorbed by the squarylium compounds, can be incorporated into the recording layer.

Stabilizing agents such as metal complexes and phenol compounds, dispersing agents, flame retarders, lubricants and plasticizers are also usable in the recording layer when necessary.

The thickness of the recording layer is determined so that the reflectance is maximized at a recording and reproduction wavelength. A suitable thickness varies depending on the index of double refraction, and a preferable range of the thickness is between 100 Å and 10 $\mu$m, more preferably between 200 Å and 2 $\mu$m.

The recording layer is formed on the undercoat layer or directly on the substrate by any one of the known methods such as vacuum evaporation; chemical vapor deposition; sputtering; and solution coating such as dip coating, spray coating, spinner coating, blade coating, roller coating and curtain coating.

(4) Light-Absorption Layer

The light-absorption layer absorbs light which is applied to the recording medium for information recording, and generates thermal energy to make some optical changes on the light-reflection layer or the interface between the light-reflection layer and the light-absorption layer.

In order to achieve the above, the same materials as those usable for the light-reflection layer are basically employed, but it is necessary to select the materials which have higher absorbance at a recording wavelength compared with the materials used for light-reflection layer.

Regarding auxiliary additives, the same compounds as those employed in the light-reflection layer so as to improve the stability of the layer can also be used in the light-absorption layer.

The thickness of the light-absorption layer is determined by both the light-absorptivity and the thermal conductivity, and, in general, the light-absorption layer having a thickness of 100 Å or more is preferably employed in the recording medium of the present invention. In the case where a layer serves as both a light-absorption layer and a protective layer, the layer having a thickness of 100 $\mu$m or more is also acceptable.

(5) Thermofusible Layer

The thermofusible layer is fused by the heat generated in the light-reflection-absorption layer when laser beams are applied to the recording medium. The fused thermofusible layer optically changes the light-absorption layer at the interface therebetween, so that information can be recorded effectively.

When the above action of the thermofusible layer is taken into consideration, those materials which are fused at temperatures lower than the melting point or decomposition temperature of the light-reflection-absorption layer are preferably employed for the thermo-melting layer.

Examples of such materials include low molecular organic compounds, coloring agents and thermoplastic resins; and more specifically polymethylacrylate, polycarbonate, epoxy resin, polystyrene, polyester resin, vinyl resin cellulose, aliphatic hydrocarbon resin, aromatic hydrocarbon resin, natural rubber, styrene-butadiene resin, chloroprene rubber, waxes, alkid resin, drying oil and rosin.

A preferable melting point of the thermofusible layer is 100° C. or more, and a preferable thickness of the same is 50 Å or more.

A light-absorption material which absorbs the light employed for recording and reproduction of information can be used in the thermofusible layer to reduce loss of the applied light and to improve the sensitivity.

(6) Protective Layer [a]

In general, a protective layer is formed on the recording layer (light-reflection layer) to attain the following purposes: (i) protecting the recording layer from being scratched, dusted and stained, (ii) improving the preservation stability of the recording layer, and (iii) improving the reflectance of the recording layer.

In order to achieve these purposes, all the aforementioned materials for the undercoat layer are employable in the protective layer.

However, in order to obtain higher sensitivity and C/N ratio, the following materials are preferably employed for a protective layer [a] in the present invention: inorganic materials such as SiO and $SiO_2$; and thermoplastic or thermofusible resins such as polymethylacrylate, polycarbonate, epoxy resin, polystyrene, polyester resin, vinyl resin, cellulose, aliphatic hydrocarbon resin, aromatic hydrocarbon resin, natural rubber, styrene-butadiene rubber, chloroprene rubber, waxes, alkid resin, drying oil and rosin.

(7) Protective Layer [b]

The protective layer [b] is formed on the recording layer to attain the following purposes: (i) protecting the recording layer from being scratched, dusted and stained, (ii) improving the preservation stability of the recording layer, (iii) improving the reflectance of the recording layer, and (iv) improving the sensitivity of the recording layer.

The aforementioned coloring materials (dyes, pigments, metals and metal compounds) whose absorption curves have the peak in the vicinity of the wavelength of laser beams applied for information recording can be used in the protective layer [b].

In order to improve the sensitivity and C/N ratio, thermoplastic or thermofusible resins such as polymethylacrylate, polycarbonate, epoxy resin, polystyrene, polyester, vinyl resin, cellulose, aliphatic hydrocarbon resin, aromatic hydrocarbon resin, natural rubber, styrene-butadiene resin, chloroprene resin, waxes, alkyd resin, drying oil and rosin can be used together with the coloring materials.

When the sensitivity and mechanical properties of the protective layer are taken into consideration, the coloring material and the thermoplastic or thermofusible resin are employed in the ratio (weight basis) ranging from 5/95 to 70/30, and preferably from 20/80 to 60/40.

On the protective layer [b], a protective layer which is made of a different material from that of the protective layer [b] can further be formed. In this case, the second protective layer is not required to contain any coloring materials described above.

(8) Protective Layer [c]

The protective layer [c] is formed on the recording layer so as to attain the same purposes as described in relation to the protective layer [b].

Polymeric dyes whose absorption curves have the peak in the vicinity of the wavelength of laser beams applied for information recording are employed in the protective layer [c].

Examples of the polymeric dyes usable for the protective layer [c] are as follows:

[1] polymeric dyes prepared by polymerizing or condensating chromophoric groups having two or more functional groups;

[2] polymeric dyes prepared by condensation between chromophoric groups having one or more functional groups and a copolycondensated compound having two or more functional groups;

[3] ionic polymeric dyes having chromophoric groups serving as counter ions; and

[4] polymeric materials in which chromophoric groups are chemically condensated one another through metal atoms contained in the chromophoric groups or chemically combined by means of coordination bonding.

Specific examples of the above respective polymeric dyes and materials [1] to [4] are as follows:

[1] cyanine, merocyanine, pyrylium and polymethine dyes having functional groups such as —OH, —COOH, —CH=CH₂, —NH₂,—CHO, $$\diagdown \diagup \atop O$$

and —NCO through an alkyl group of a residual hetero ring or nitrogen atom thereof;

squalyrium, croconium and azulene dyes having the above functional groups through a terminal residual aromatic ring, residual hetero ring or nitrogen atom thereof;

anthraquinone, phenylene, naretylene and azo dyes combined with the above functional groups directly or through the alkyl group; and polymeric dyes prepared by polymerizing or condensating phthalocyanine, naphthalocyanine, polyphirine, choline or corol dyes combined with functional groups such as —OH, —COOH, —NH₂, —COCl, —SO₂Cl and —CH=CH₂ at the benzene ring thereof;

[2] polymer dyes prepared by condensation between a copolymerized compound having one or more types of functional groups such as —OH, —COOH, —NH₂, —CHO, $$\diagdown \diagup \atop O ,$$

—NCO, —COCl, —SO₃H and SO₂Cl, and a coloring material having at least one of the above functional groups;

[3] polymer dyes in which polymers having anionic acid groups such as —COO⁻ and —SO₃⁻ are bonded with cations of coloring materials such as cyanine, azlene, pyrylium and polymethine; and

[4] polymeric dyes prepared by combining a dymeric acid polyamide (imidazoline, pyridine or imidazole) polymer with an organic large-ring chromophoric group containing a metallic element such as Ge, Sn, Al, Ga, In, transition metal, alkali metal, lanthanide metal, or actinide metal by means of coordination bonding; and polymeric dyes prepared by conducting cross-linkage between a polymer having a group of —OH, —COOH or —SO₃H and a coloring material having a functional group such as —OH, —COOH or —NHR by using a metal (Ti, Zr, Si or Ge) alkoxide, xylate, or acylate.

On the protective layer [c], a protective layer made of a material different from those of the above protective layer can be formed. In this case, the second protective layer is not required to contain any polymeric dyes described above.

Auxiliary components such as stabilizers, dispersing agents, lubricants, electrification prevention agents, surface active agents and plasticizers can be added in the protective layer [c].

Other features of this invention will become apparent in the course of the following description of exemplary embodiments, which are given for illustration of the invention and are not intended to be limiting thereof.

EXAMPLE 1-1

[Procedure 1]

A compound having the following formula (1) was dissolved in an amount of approximately 1 wt. % in 1,2-dichloroethane.

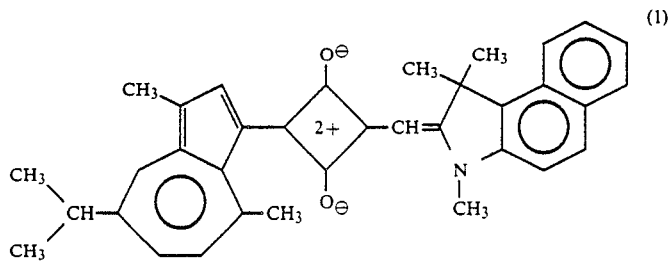

The thus prepared solution was diluted with 1,2-dichloroethane to 1/100, and the resulting diluted solution was subjected to the measurement of its absorption spectrum. As a result, an absorption peak was observed at a wavelength of 690 nm.

A hard-coated acrylic plate was spin-coated with the above undiluted solution, and its reflection and absorption spectra were measured. The obtained reflection an absorption curves are shown in the chart in FIG. 1.

Acrylic plates coated with coloring layers having various thicknesses were prepared. The thickness of the coloring layer was adjusted by changing the number of the revolutions of the acrYlic plate during the spin coating. The reflectance and transmittance of each of the thus prepared samples were determined by applying 790 nm light, and the transmittance was converted to an optical density.

The optical density is defined by log (Io/I), where I represents the intensity of the light after passing through a layer and Io is the initial intensity. The values of the reflectance and transmittance were plotted against the thickness of the dye layer (recording layer) as shown in FIG. 3. This graph demonstrates that the reflectance is maximized at a thickness at which the absorbance is 0.4.

[Procedure 2]

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm. The thus prepared substrate was spin-coated with the undiluted solution prepared in Procedure 1 so that the recording layer can have an optical density of 0.4, whereby a recording medium No. 1-1 according to the present invention was prepared. [Procedure 3]

While rotating the recording medium No. 1-1 at a line speed of 2.1 m/sec, a semiconductor laser beam of 790 nm was applied to the substrate of the recording medium. The diameter of the laser beam at the writing spot on the recording layer was approximately 1.3 μm. The recording was conducted with a basic frequency of 0.5 MHz. The C/N ratio was 55 dB when a recording power of 3 mW was applied. Thus it was confirmed that the recording was successfully achieved. The drop in amplitude after 1,000,000-time reproduction of the recorded information, with application of a reproduction power of 0.3 mW thereto, was only about 10%.

COMPARATIVE EXAMPLE 1-1

Procedure 1 and Procedure 2 in Example 1-1 were repeated except that the optical density of the recording layer was changed from 0.4 to 0.6, whereby a comparative recording medium No. 1-1 was prepared.

The above-prepared recording medium was evaluated in the same manner as in Procedure 3 in Example 1-1. As a result, it was found that the C/N ratio was 45 dB, and the drop in amplitude after 1,000,000-time reproduction of the recorded information was 25%.

COMPARATIVE EXAMPLE 1-2

Procedure 1 and Procedure 2 in Example 1-1 were repeated except that the optical density of the recording layer was changed from 0.4 to 0.25, whereby a comparative recording medium No. 1-2 was prepared.

The above-prepared recording medium was evaluated in the same manner as in Procedure 3 in Example 1-1. As a result, it was found that the C/N ratio was 55 dB, but the drop in amplitude after 1,000,000-time reproduction of the recorded information was about 35%.

EXAMPLE 1-2

A recording medium was prepared in the same manner as in Procedure 1 and Procedure 2 in Example 1-1. 2 wt. % of an aromatic hydrocarbon resin (trademark "PETROSIN #130", made by Mitsui Petrochemical Industries, Ltd.) was dissolved in cyclohexane, and the resulting solution was spin-coated at 400 rpm onto the recording layer of the above-prepared recording medium to further form a protective layer, whereby a recording medium No. 1-2 according to the present invention was prepared.

The thus prepared recording medium was evaluated in the same manner as in Procedure 3 in Example 1-1. As a result, it was found that the C/N ratio was 53 dB, and the drop in amplitude after 1,000,000-time reproduction of the recorded information was only 7%.

EXAMPLE 1-3

Procedure 1 and Procedure 2 in Example 1-1 were repeated except that the compound (1) used in Example 1-1 was replaced by a compound having the following formula (2), whereby a recording medium No. 1-3 according to the present invention was prepared.

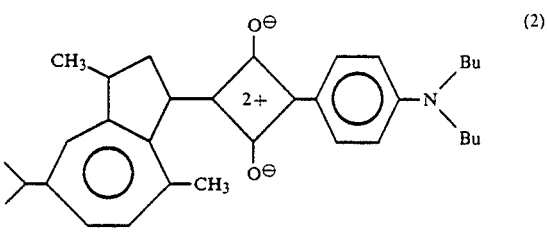

The above-prepared recording medium was evaluated in the same manner as in Procedure 3 in Example 1-1. As a result, it was found that the C/N ratio was 55 dB, and the drop in amplitude after 1,000,000-time reproduction of the recorded information was only about 10%.

EXAMPLES 1-4 to 1-11

Procedure 1 and Procedure 2 in Example 1-1 were repeated except that the compound (1) used in Example 1-1 was replaced by compounds (3) to (10) shown in Table 1, whereby recording media Nos. 1-4 to 1-11 were prepared, respectively. A protective layer was formed on the recording layer properly.

The above-prepared recording media were each evaluated in the same manner as in Procedure 3 in Example 1-1. The results are shown in Table 2.

TABLE 1

| Compound No. | General Formula |
|---|---|
| 3 | [structure] |
| 4 | [structure] $CH_3SO_4^\ominus$ |
| 5 | [structure] |
| 6 | Phthalocyanine |
| 7 | [structure] $ClO_4^\ominus$ |
| 8 | [structure] $ClO_4^\ominus$ |
| 9 | [structure] |

TABLE 1-continued

| Compound No. | General Formula |
|---|---|
| 10 | (structure) |

TABLE 2

| Example | Comp'd No | $R_{max}$ | $A_{max}$ | Protective Layer | C/N | Drop in * Amplitude |
|---|---|---|---|---|---|---|
| 1-4 | 3 | 795 | 715 | none | 54 | unmeasured |
| 1-5 | 4 | 760 | 670 | aromatic hydrocarbon resin | 51 | unmeasured |
| 1-6 | 5 | 835 | 670 | aromatic hydrocarbon resin | 53 | unmeasured |
| 1-7 | 6 | 860 | 730 | vinyl resin | 45 | 0% |
| 1-8 | 7 | 800 | 715 | none | 50 | unmeasured |
| 1-9 | 8 | 830 | 680 | none | 52 | unmeasured |
| 1-10 | 9 | 820 | 750 | aliphatic hydrocarbon resin | 50 | unmeasured |
| 1-11 | 10 | 810 | 780 | none | 50 | unmeasured |

* after 1,000,000-time reproduction

EXAMPLE 2-1

[Procedure 1]

Procedure 1 in Example 1-1 was repeated.

[Procedure 2]

Figure 8:
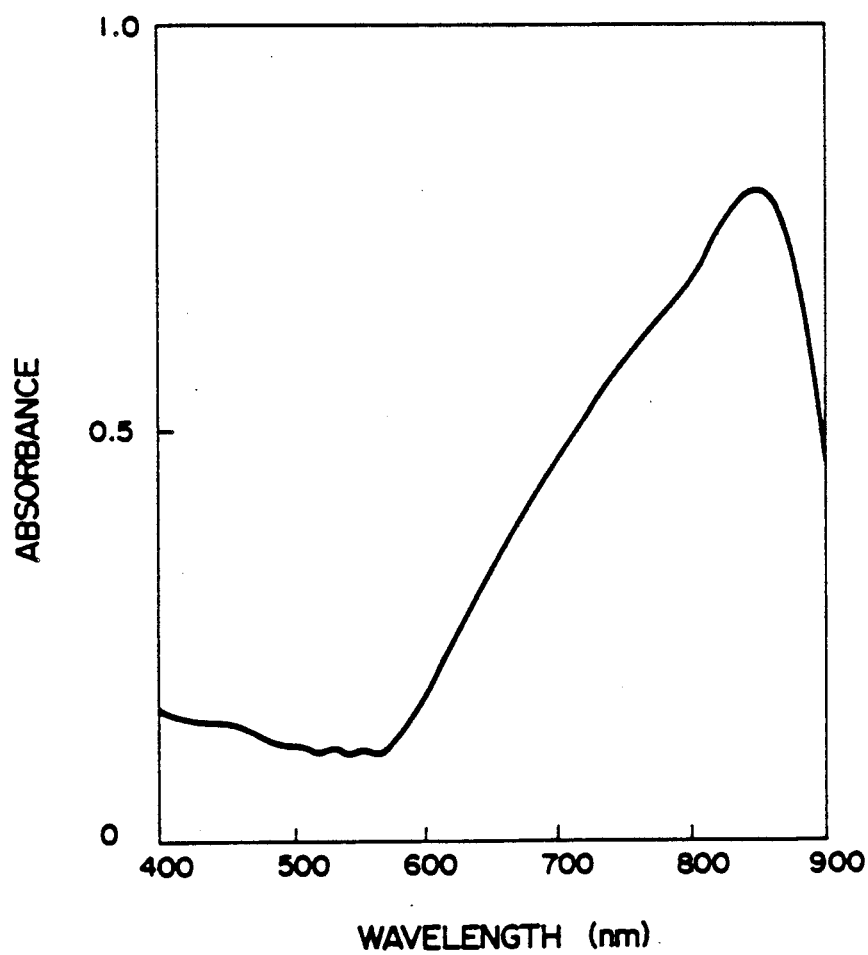
FIG. 8 is a chart showing the absorption curve of the pigment represented by formula (11) which will be explained later.

A polymethyl methacrylate plate having a thickness of 1.2 mm and a diameter of 130 mm was provided with spiral grooves made of an acrylic photopolymer, having a depth of 900 Å, a half width of 0.4 μm, and a pitch of 1.6 μm. The thus prepared substrate was spin-coated with the undiluted solution prepared in the above Procedure 1 so that the recording layer can have an optical density of 0.4, followed by vacuum deposition of an organic dye having formula (11), whose absorption spectrum chart is shown in FIG. 8, whereby a recording medium No. 2-1 according to the present invention was prepared.

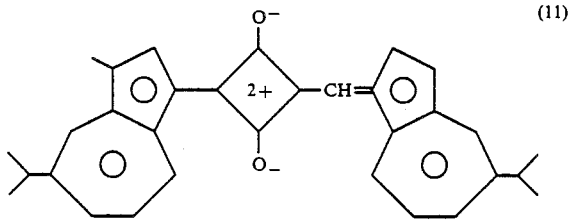

(11)

[Procedure 3]

While rotating the above prepared recording medium at a line speed of 2.1 m/sec, a semiconductor laser beam of 790 nm was applied to the substrate of the recording medium. The diameter of the laser beam at the writing spot on the recording layer was approximately 1.3 μm. The recording was conducted with a basic frequency of 0.5 MHz. The C/N ratio was 57 dB when recording power of 3 mW was applied, and it was thus confirmed that the recording was successfully achieved. The drop in amplitude after 1,000,000-time reproduction of the recorded information, with application of a reproduction power of 0.3 mW, was only about 10%.

COMPARATIVE EXAMPLE 2-1

Procedure 1 and Procedure 2 in Example 2-1 were repeated except that the optical density was changed from 0.4 to 0.6, whereby a comparative recording medium No. 2-1 was prepared.

The above-prepared recording medium was evaluated in the same manner as in Procedure 3 in Example 2-1. As a result, it was found that the C/N ratio was 40 dB, and the drop in amplitude after 1,000,000-time reproduction of the recorded information was about 25%.

COMPARATIVE EXAMPLE 2-2

Procedure 1 and Procedure 2 in Example 2-1 were repeated except that the optical density was changed from 0.4 to 0.25, whereby a comparative recording medium No. 2-2 was prepared.

The above-prepared recording medium was evaluated in the same manner as in Procedure 3 in Example 2-1. As a result, it was found that the C/N ratio was 55 dB, but the drop in amplitude after 1,000,000-time reproduction of the recorded information was about 30%.

EXAMPLE 2-2

A recording medium was prepared in the same manner as in Procedure 1 and Procedure 2 in Example 2-1. An aromatic hydrocarbon resin (trademark "PETROSIN #130", made by Mitsui Petrochemical Industries, Ltd.) was dissolved in cyclohexane in an amount of 2 wt. %, and the resulting solution was spin-coated at 400 rpm on the recording layer of the above-prepared recording medium to further form a protective layer, whereby a recording medium No. 2-2 according to the present invention was prepared.

The thus prepared recording medium was evaluated in the same manner as in Procedure 3 of Example 2-1. As a result, it was found that the C/N ratio was 53 dB, and the drop in amplitude after 1,000,000-time reproduction of the recorded information was only about 7%.

Example 2-3

Procedure 1 and Procedure 2 in Example 2-1 were repeated except that the compound (1) used in Example 2-1 was replaced by a compound having the following formula (2), whereby a recording medium No. 2-3 according to the present invention was prepared.

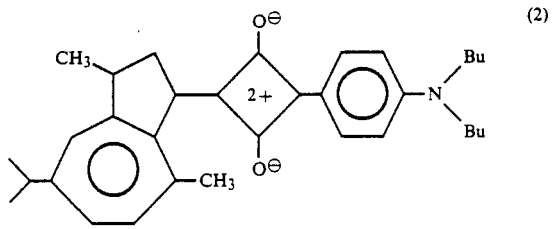

(2)

The above-prepared recording medium was evaluated in the same manner as in Procedure 3 in Example 2-1. As a result, it was found that the C/N ratio was 57 dB, and the drop in amplitude after 1,000,000-time reproduction of the recorded information was only about 10%.

EXAMPLES 2-4 to 2-11

Procedure 1 and Procedure 2 in Example 2-1 were repeated except that the compound (1) used in Example 2-1 was replaced by compounds (3) to (10) used in Examples 1-4 to 1-11 (see Table 1), whereby recording media Nos. 2-4 to 2-11 were prepared, respectively. A protective layer was formed on the recording layer properly.

The above-prepared recording media were each evaluated in the same manner as in Procedure 3 in Example 2-1. The results are shown in Table 3.

TABLE 3

| Ex. | R Comp'd No. | A Comp'd No. | $R_{max}$ | $A_{max}$ | Protective Layer | C/N | Drop in Amplitude * |
|---|---|---|---|---|---|---|---|
| 2-4 | 3 | 11 | 795 | 715 | none | 54 | — |
| 2-5 | 4 | 10 | 760 | 670 | none | 51 | — |
| 2-6 | 5 | 11 | 835 | 670 | none | 53 | — |
| 2-7 | 6 | 10 | 860 | 730 | vinyl resin | 45 | 0% |
| 2-8 | 7 | 11 | 800 | 715 | none | 50 | — |
| 2-9 | 8 | 11 | 830 | 680 | none | 52 | — |
| 2-10 | 9 | 11 | 820 | 750 | aliphatic hydrocarbon resin | 50 | — |
| 2-11 | 10 | 11 | 810 | 780 | none | 50 | — |

In the above table, "R Comp'd No." is a compound No. used for a light-reflection layer; "A Comp'd No." is a compound No. used for a light-absorption layer; and the item marked with "—" was unmeasured.
* after 1,000,000-time reproduction

EXAMPLE 3-1

[Procedure 1]

Procedure 1 in Example 1-1 was repeated.

[Procedure 2]

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm. The thus prepared substrate was spin-coated with the above-prepared undiluted solution so that the recording layer can have an optical density of 0.4, and then a hexane solution of apiezone wax having a melting point of 100° C. was further coated to form a thermomelting layer having a thickness of 300 Å, whereby a recording medium No. 3-1 according to the present invention was prepared.

[Procedure 3]

While rotating the above-prepared recording medium at a line speed of 2.1 m/sec, a semiconductor laser beam of 790 nm was applied to the substrate of the recording medium. The diameter of the laser beam at the writing spot on the recording layer was approximately 1.3 μm. The recording was conducted with a basic frequency of 0.5 MHz. The C/N ratio was 53 dB when recording power of 3 mW was applied. Thus it was confirmed that the recording was successfully achieved. The drop in amplitude after 1,000,000-time reproduction of the recorded information, with application of a reproduction power of 0.3 mW, was only about 10%.

COMPARATIVE EXAMPLE 3-1

Procedure 1 and Procedure 2 in Example 3-1 were repeated except that the optical density of the recording layer was changed from 0.4 to 0.6, whereby a comparative recording medium No. 3-1 was prepared.

The above-prepared recording medium was evaluated in the same manner as in Procedure 3 in Example 3-1. As a result, it was found that the C/N ratio was 40 dB, and the drop in amplitude after 1,000,000-time reproduction of the recorded information was about 25%.

COMPARATIVE EXAMPLE 3-2

Procedure 1 and Procedure 2 in Example 3-1 were repeated except that the optical density of the recording layer was changed from 0.4 to 0.25, whereby a comparative recording medium No. 3-2 was prepared.

The above-prepared recording medium was evaluated in the same manner as in Procedure 3 in Example 3-1. As a result, it was found that the C/N ratio was 55 dB, but the drop in amplitude after 1,000,000-time reproduction of the recorded information was about 30%.

EXAMPLE 3-2

A recording medium was prepared by the same manner as in Procedure 1 and Procedure 2 in Example 3-1. Thereafter, the recording layer was vacuum-deposited with SiO (1000 Å thick) to form a protective layer, whereby a recording medium No. 3-2 according to the present invention was prepared.

The above-prepared recording medium was evaluated in the same manner as in Procedure 3 in Example 3-1. As a result, it was found that the C/N ratio was 51 dB, and the drop in amplitude after 1,000,000-time reproduction of the recorded information was only about 7%.

EXAMPLE 3-3

Procedure 1 and Procedure 2 in Example 3-1 were repeated except that the compound (1) used in Example 3-1 was replaced by a compound having the following formula (2), whereby a recording medium No. 3-3 according to the present invention was prepared.

The thus prepared recording medium was evaluated in the same manner as in Procedure 3 in Example 3-1. As a result, it was found that the C/N ratio was 53 dB, and the drop in amplitude after 1,000,000-time reproduction of the recorded information was only about 10%.

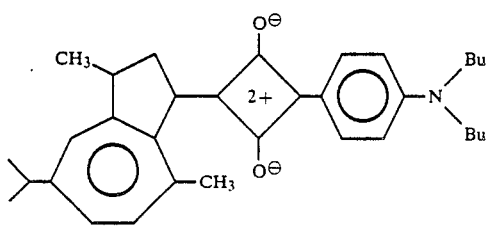

(2)

EXAMPLES 3-4 to 3-11

Procedure 1 and Procedure 2 in Example 3-1 were repeated except that the compound (1) used in Example 3-1 was replaced by compounds (3) to (10) used in Examples 1-4 to 1-11 (see Table 1), whereby recording media Nos. 3-4 to 3-11 according to the present invention were prepared, respectively. A protective layer was formed on the recording layer properly. In Example 3-11, a cyanine dye (trademark "NH-125", made by Japanese Research Institute for Photosensitizing Dyes Co., Ltd.) was incorporated into the thermofusible layer (recording layer) as a light-absorption agent.

The above-prepared recording media were evaluated in the same manner as in Procedure 3 in Example 3-1. The results are shown in Table 4.

TABLE 4

| Ex. | Light-Reflection Layer Compound No. | $R_{max}$ | $A_{max}$ | Protective Layer | C/N | Drop in Amplitude * |
|---|---|---|---|---|---|---|
| 3-4 | 3 | 795 | 715 | none | 51 | — |
| 3-5 | 4 | 760 | 670 | none | 52 | — |
| 3-6 | 5 | 835 | 670 | none | 52 | — |
| 3-7 | 6 | 860 | 730 | vinyl resin | 50 | 0% |
| 3-8 | 7 | 800 | 715 | none | 53 | — |
| 3-9 | 8 | 830 | 680 | epoxy resin | 51 | — |
| 3-10 | 9 | 820 | 750 | aliphatic hydrocarbon resin | 53 | — |
| 3-11 | 10 | 810 | 780 | none | 54 | — |

In the above table, the item marked with "—" was unmeasured.
* after 1,000,000-time reproduction

EXAMPLE 4-1

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm, thereby preparing a substrate.

A 1,2-dichloroethane solution containing 1 wt. % of a compound having the following formula (12) was spin-coated onto the above-prepared substrate to form a recording layer so that the recording layer indicates a reflectance of 0.4 when 790 nm light is applied thereto (FIGS. 2 and 3).

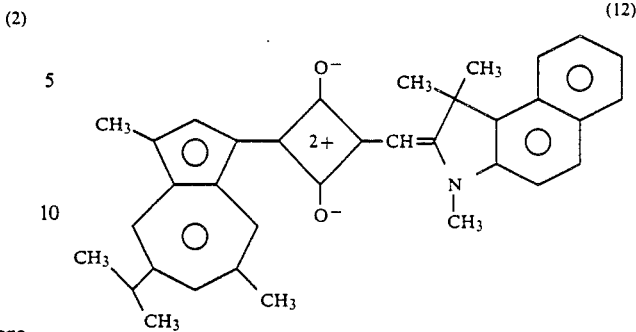

(12)

On the above recording layer, a carbon tetrachloride dispersion containing 10 wt. % of a mixture consisting of 30 wt. % of a coloring material having formula (13) and 70 wt. % of a vinylchloride-vinylacetate copolymer was coated to form a protective layer having a thickness of 5 μm, whereby a recording medium No. 4-1 according to the present invention was prepared.

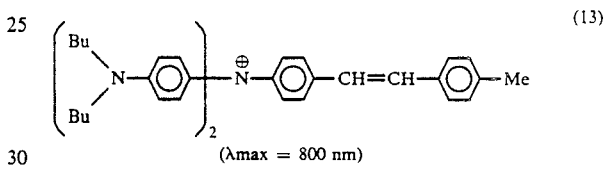

(13)

(λmax = 800 nm)

EXAMPLE 4-2

Example 4-1 was repeated except that the coloring material (13) used in the protective layer of the recording medium No. 4-1 was replaced by a coloring material having the following formula (14), whereby a recording medium No. 4-2 according to the present invention was prepared.

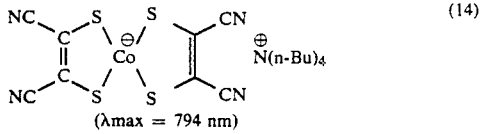

(14)

(λmax = 794 nm)

EXAMPLE 4-3

Example 4-1 was repeated except that the compound (12) used in the recording layer of the recording medium No. 4-1 was replaced by a compound having the following formula (15) thereby preparing a recording layer.

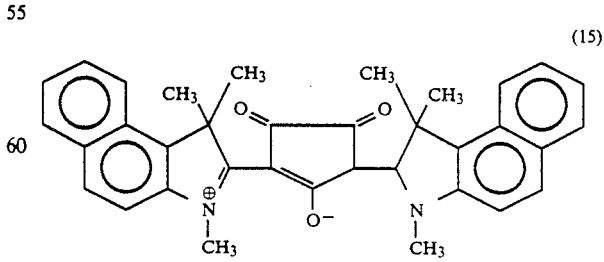

(15)

Onto the above-prepared recording layer, a cyclohexane dispersion containing 20 wt. % of a compound having the following formula (16) and 80 wt. % of an aromatic hydrocarbon resin (trademark "PETROSIN #130") was coated to form a protective layer, whereby a recording medium No. 4-3 according to the present invention was prepared.

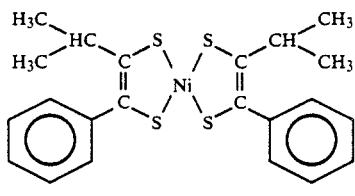

(λmax = 795 nm)

EXAMPLE 4-4

Example 4-3 was repeated except that the compound (16) used in Example 4-3 was replaced by a compound having the following formula (17), whereby a recording medium No. 4-4 according to the present invention was prepared.

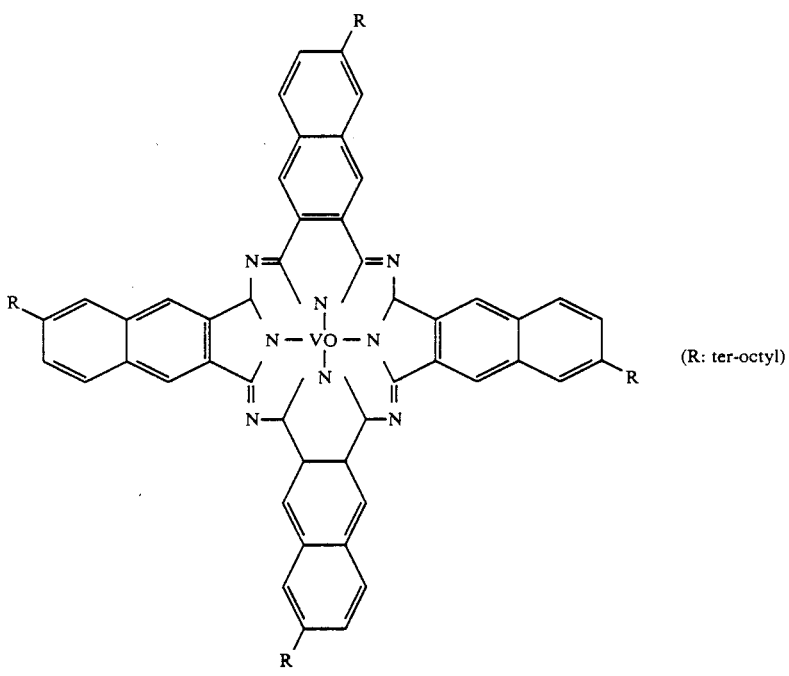

(R: ter-octyl)

(λmax = 808 nm)

EXAMPLE 4-5

Example 4-1 was repeated except that the compound (12) used in Example 4-1 was replaced by a compound having the following formula (18), whereby a recording medium No. 4-5 according to the present invention was prepared.

EXAMPLE 4-6

Example 4-1 was repeated except that the compound (12) used in Example 4-1 was replaced by a 100/15 (weight basis) mixture of the compound (18) used in Example 4-5 and a metal complex having the following formula (19), whereby a recording medium No. 4-6 according to the present invention was prepared.

(19)

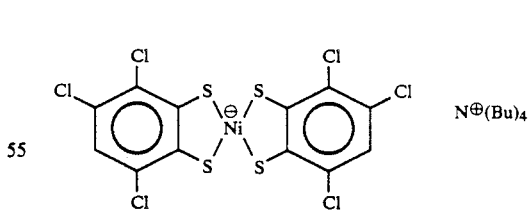

EXAMPLE 4-7

A recording medium was prepared in the same manner as in Example 4-1. To the protective layer of the thus prepared recording medium, a 1,2-dichloroethane solution containing 5 wt. % of polymethyl methacrylate was further applied to form a second protective layer having a thickness of 5 μm, whereby a recording medium No. 4-7 according to the present invention was prepared.

COMPARATIVE EXAMPLES 4-1 to 4-3

Examples 4-1, 4-3 and 4-5 were repeated except that the protective layers were each prepared without employing the coloring materials, whereby comparative recording media Nos. 4-1, 4-2 and 4-3 were prepared, respectively.

While rotating the above-prepared recording media at a line speed of 2.1 mm/sec, a semiconductor laser beam of 790 nm were applied to the substrate of each recording medium.

The diameter of the laser beam at the writing spot on the recording layer of each recording medium was approximately 1.3 μm. The recording was conducted with a basic frequency of 0.5 MHz. Proper recording power and reproduction C/N ratio of each recording medium are shown in Table 5. Note that proper recording power is a recording power with which the eye center becomes 50% when random patterns are recorded.

TABLE 5

| Recording Medium | Proper Recording Power (mW) | C/N (dB) |
| --- | --- | --- |
| No. 4-1 | 3.0 | 52 |
| No. 4-2 | 3.0 | 51 |
| No. 4-3 | 2.9 | 53 |
| No. 4-4 | 3.1 | 52 |
| No. 4-5 | 3.0 | 51 |
| No. 4-6 | 3.0 | 51 |
| No. 4-7 | 3.0 | 52 |
| Comp. No. 4-1 | 3.5 | 48 |
| Comp. No. 4-2 | 3.3 | 51 |
| Comp. No. 4-3 | 3.3 | 49 |

EXAMPLE 5-1

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm, thereby preparing a substrate.

On this substrate, a compound having the following formula (20) was vacuum-deposited under the pressure of $10^{-6}$ Torr or less to form a recording layer having a thickness of 700 Å.

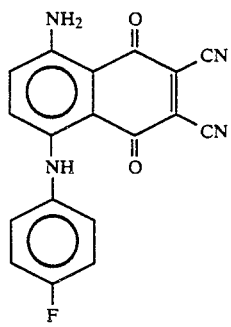
(20)

A compound having the following formula (A) was dissolved in a 5/5 (weight basis) mixture of 1,2-dichloroethane and methanol, and the resulting solution was spin-coated onto the above-prepared recording layer to form a protective layer having a thickness of 5 μm, whereby a recording medium No. 5-1 according to the present invention was prepared.

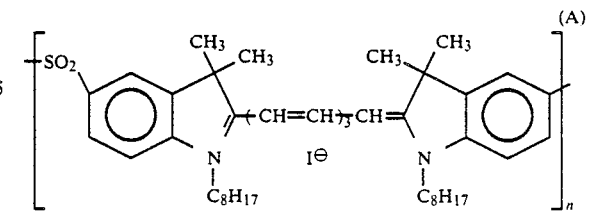
(A)

EXAMPLE 5-2

Example 5-1 was repeated except that the compound (A) was replaced by a compound having the following formula (B), whereby a recording medium No. 5-2 according to the present invention was prepared.

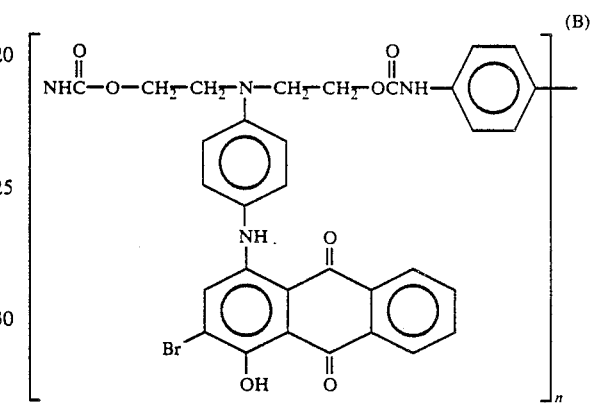
(B)

Example 5-3

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm, thereby preparing a substrate.

Onto this substrate, a 1,2-dichloroethane solution of a compound having the following formula (21) was spin-coated to form a recording layer having a thickness of 700 Å.

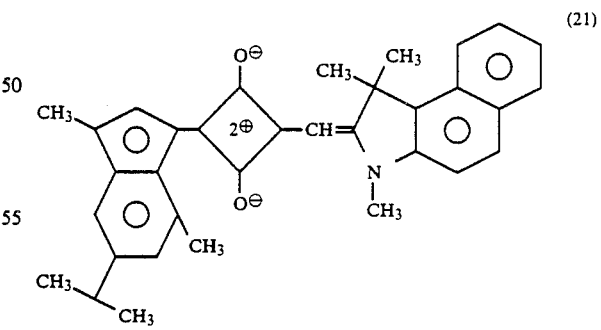
(21)

A protective layer was formed on the above-prepared recording layer in the same manner as in Example 5-2, whereby a recording medium No. 5-3 according to the present invention was prepared.

EXAMPLE 5-4

A polymethyl methacrylate plate having a thickness of 1.2 mm and a diameter of 130 mm was provided with spiral grooves made of an acrylic photopolymer, having a depth of 900 Å, a half width of 0.4 μm and a pitch of 1.6 μm, thereby preparing a substrate.

Onto this substrate, a compound having the following formula (22) was vacuum-deposited under the pressure of $10^{-6}$ Torr or less to form a recording layer having a thickness of 700 Å.

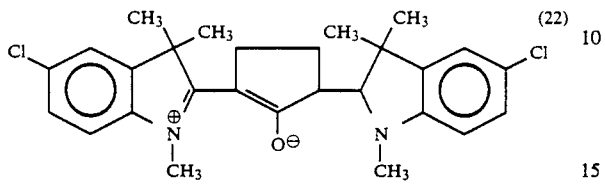

A chloroform solution of a compound having the following formula (C) was spin-coated onto the above-prepared recording layer to form a protective layer having a thickness of 5 μm, whereby a recording medium No. 5-4 according to the present invention was prepared.

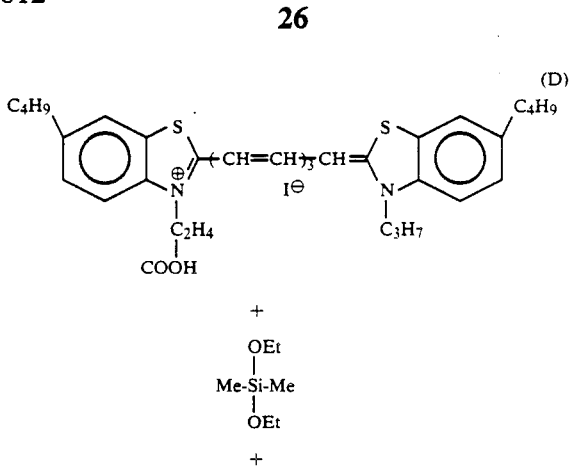

EXAMPLE 5-6

A substrate was prepared in the same manner as in Example 5-1. On this substrate, a 100/15 (weight basis) mixture of the compound (22) and a metal complex having the following formula (23) was vacuum-deposited under the pressure of $10^{-6}$ Torr or less to form a recording layer having a thickness of 700 Å.

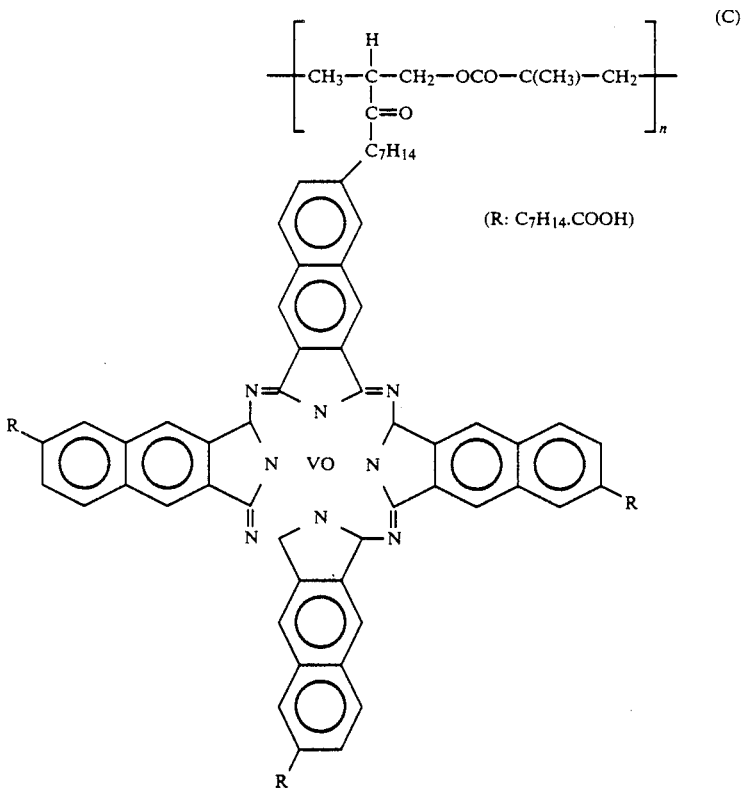

EXAMPLE 5-5

A recording layer prepared in the same manner as in Example 5-4 was spin-coated with a solution prepared by dissoloving a compound mixture (D) shown below (weight ratio 1/1/1) into a 20/80 (weight basis) mixture of 1,2-dichloromethane and methanol, and placed in an oven at 80° C. for 2 hours to form a protective layer having a thickness of 5 μm, whereby a recording medium No. 5-5 according to the present invention was prepared.

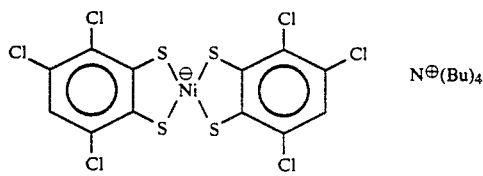
(23)

A protective layer was formed on this recording layer in the same manner as in Example 5-1, whereby a recording medium No. 5-6 according to the present invention was prepared.

EXAMPLE 5-7

A recording medium was prepared in the same manner as in Example 5-1. Onto the protective layer of this recording medium, a 1,2-dichloroethane solution containing 5 wt. % of polymethyl methacrylate was coated to further form a second protective layer having a thickness of 5 μm, whereby a recording medium No. 5-7 according to the present invention was prepared.

COMPARATIVE EXAMPLE 5-1

Example 5-1 was repeated except that the protective layer in Example 5-1 was replaced by a protective layer formed by using a carbon tetrachloride solution of a vinylchloride-vinylacetate copolymer, whereby a comparative recording medium No. 5-1 was prepared.

COMPARATIVE EXAMPLE 5-2

Example 5-3 was repeated except that the protective layer in Example 5-3 was replaced by a protective layer formed by using a carbon tetrachloride solution of a vinylchloride-vinylacetate copolymer, whereby a comparative recording medium No. 5-2 was prepared.

COMPARATIVE EXAMPLE 5-3

Example 5-5 was repeated except that the protective layer in Example 5-5 was replaced by a protective layer formed by using a carbon tetrachloride solution of a vinylchloride-vinylacetate copolymer, whereby a comparative recording medium No. 5-3 was prepared.

COMPARATIVE EXAMPLE 5-4

Onto a substrate prepared in the same manner as in Example 5-1, a 1,2-dichloroethane solution of the compound (21) was spin-coated to form a recording layer.

A carbon tetrachloride dispersion containing 10 wt. % of a mixture consisting of 30 wt. % of a compound having the following formula (E) and 70 wt. % of a vinylchloride-vinylacetate copolymer was coated onto the above-prepared recording layer to form a protective layer having a thickness of 5 μm, whereby a comparative recording medium No. 5-4 was prepared.

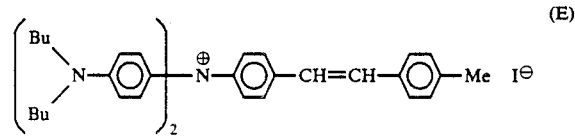
(E)

While rotating the above-prepared recording media of the present invention and the comparative recording media at a line speed of 2.1 m/sec, a semiconductor laser beam of 790 nm was applied tot he substrate of each recording medium.

The diameter of laser beam at the writing spot on the recording layer of each recording medium was approximately 1.3 μm. The recording was conducted with a basic frequency of 0.5 MHz. Proper recording power, reproduction C/N ratio, defect ratio right after preparation and defect ratio after preservation at 60° C. and 90 %RH for 2000 hours of each recording medium are shown in Table 6. Note that proper recording power is a recording power with which the eye center becomes 50% when random patterns are recorded.

TABLE 6

| Recording Medium | Proper Recording Power (mW) | C/N (dB) | Defect Ratio-1 ($\times 10^{-5}$) | Defect Ratio-2 ($\times 10^{-5}$) |
| --- | --- | --- | --- | --- |
| No. 5-1 | 3.0 | 52 | 1.1 | 2.5 |
| No. 5-2 | 3.2 | 51 | 1.5 | 3.1 |
| No. 5-3 | 3.1 | 51 | 0.9 | 2.0 |
| No. 5-4 | 2.8 | 53 | 1.8 | 3.4 |
| No. 5-5 | 2.9 | 52 | 1.4 | 2.9 |
| No. 5-6 | 3.1 | 51 | 1.0 | 2.1 |
| No. 5-7 | 3.0 | 52 | 1.9 | 3.6 |
| Comp. No. 5-1 | 3.3 | 46 | — | — |
| Comp. No. 5-2 | 3.5 | 48 | — | — |
| Comp. No. 5-3 | 3.5 | 49 | — | — |
| Comp No. 5-4 | 3.0 | 52 | 1.5 | 10.7 |

In the above table: "Defect Ratio-1" is directed to the defect ratio right after preparation of the recording medium; and "Defect Ratio-2" is directed to the defect ratio after preservation at 60° C. and 90% RH for 2,000 hours.

According to the present invention, a thin, inexpensive optical information recording medium having a mono-plate structure can be obtained. The recording medium of the present invention can be utilized not only in an optical disk but also in an optical card and an optical flexible disk. Compatibility with CD or CD-ROM is also considerable.

What is claimed is:

1. An optical information recording medium for use with a beam of recording or reproducing light having a wavelength in a semiconductor laser wavelength region, comprising:
    a substrate, and
    a recording layer formed thereon, said recording layer comprising, as its main component, an organic dye component, and having a maximum spectral reflectance peak near said wavelength, and a thickness such that its spectral reflectance is maximized at said wavelength.

2. The optical information recording medium as claimed in claim 1, wherein said organic dye component is selected from the group consisting of croconium dyes, azulene dyes and pigments, triphenothiazine compounds, phenanthrene derivatives, phthalocyanine compounds, tetrahydrocorrin compounds, dioxane compounds and derivatives thereof, anthraquinone derivatives, xanthene dyes, triphenylmethane dyes, squalyrium dyes, polymethine dyes, croconium dyes combined with polymethine, azulene dyes combined with polymethine.

3. The optical information recording medium as claimed in claim 1, wherein said recording layer has a thickness of about 100 Å to about 10 μm.

4. The optical information recording medium as claimed in claim 1, further comprising an undercoat layer interposed between said substrate and said recording layer.

5. The optical information recording medium as claimed in claim 1, further comprising a protective layer formed on said recording layer.

6. The optical information recording medium as claimed in claim 1, further comprising a light absorbing layer formed on said recording layer, which light absorbing layer comprises a material having a greater light absorbing property than that of said recording layer, so as to be capable of absorbing light and generating heat for effective recording in said recording layer.

7. The optical information recording medium as claimed in claim 3, wherein said protective layer comprises a coloring agent having its maximum spectral reflectance peak near the wavelength of said information recording and reproduction light, and a heat softening resin.

8. The optical information recording medium as claimed in claim 7, wherein the weight ratio of said coloring agent to said heat-softening resin in said protective layer is in the range of (5/95) to (70/30).

9. The optical information recording medium as claimed in claim 5, wherein said protective layer comprises a polymeric dye having its maximum spectral reflectance peak near the wavelength of said information recording and reproduction light.

10. The optical information recording medium as claimed in claim 9, wherein said polymeric dye in said protective layer is a polymeric dye prepared by polymerizing or condensing chromophoric groups having two or more functional groups.

11. The optical information recording medium as claimed in claim 9, wherein said polymeric dye in said protective layer is a polymeric dye prepared by condensation between chromophoric groups having one or more functional groups and a copolycondensed compound having two or more functional groups.

12. The optical information recording medium as claimed in claim 9, wherein said polymeric dye in said protective layer is an ionic polymeric dye having chromophoric groups serving as counter ions.

13. The optical information recording medium as claimed in claim 9, wherein said polymeric dye in said protective layer is a polymeric material having chemically condensed chromophoric groups through metal atoms contained in said chromophoric groups or having chemically combined chromophoric groups by coordination bonding.

14. The optical information recording medium as claimed in claim 1, further comprising a thermofusible layer formed on said recording layer, which thermofusible layer comprises a material which can be melted at a lower temperature than the melting or decomposition point of said recording layer so as to be capable of absorbing light and generating heat for effective recording of information in said recording layer.

15. An optical information recording method comprising the steps of:

applying a light beam having a wavelength in any semiconductor laser wavelength region to an optical information recording medium comprising a substrate and a recording layer formed thereon, said recording layer comprising, as its main component, an organic dye component, and having a maximum spectral reflectance peak at a wavelength near said particular wavelength, and having a thickness such that its spectral reflectance is maximized at said particular wavelength, and modifying the interference structure of said recording layer so as to correspond to the information to be recorded by the light applied thereto.

16. A system for recording and/or reproducing information, including:

an optical information recording medium comprising a substrate and à recording layer formed thereon, and means for applying a beam of recording or reproducing light having a wavelength in a semiconductor laser wavelength region to the recording medium to record information therein or to reproduce information previously recorded therein, said recording layer comprising, as its main component, an organic dye component, and having a maximum spectral reflectance peak at a wavelength near the particular wavelength, and having a thickness such that its spectral reflectance is maximized at said wavelength in a semiconductor laser wavelength region.

17. The system for recording and/or reproducing information as claimed in claim 16, wherein said recording or reproducing light has a wavelength in a range between about 770 and about 840 nm.

* * * * *